FLUID LOGIC RING COUNTER

Filed June 24, 1964 2 Sheets-Sheet 1

INVENTOR.
CAVAS M. GOBHAI
EDWARD SCHOPPE, JR.
BY Lawrence H. Paxton
AGENT

FLUID LOGIC RING COUNTER
Filed June 24, 1964 2 Sheets-Sheet 2
| PULSE NO. | | OUTPUT 1 | OUTPUT 2 | OUTPUT 3 |
|---|---|---|---|---|
| | 1 | 0 | 0 | 1 |
| | 2 | 1 | 0 | 0 |
| | 3 | 0 | 1 | 0 |
| | 4 | 0 | 0 | 1 |
FIG. II
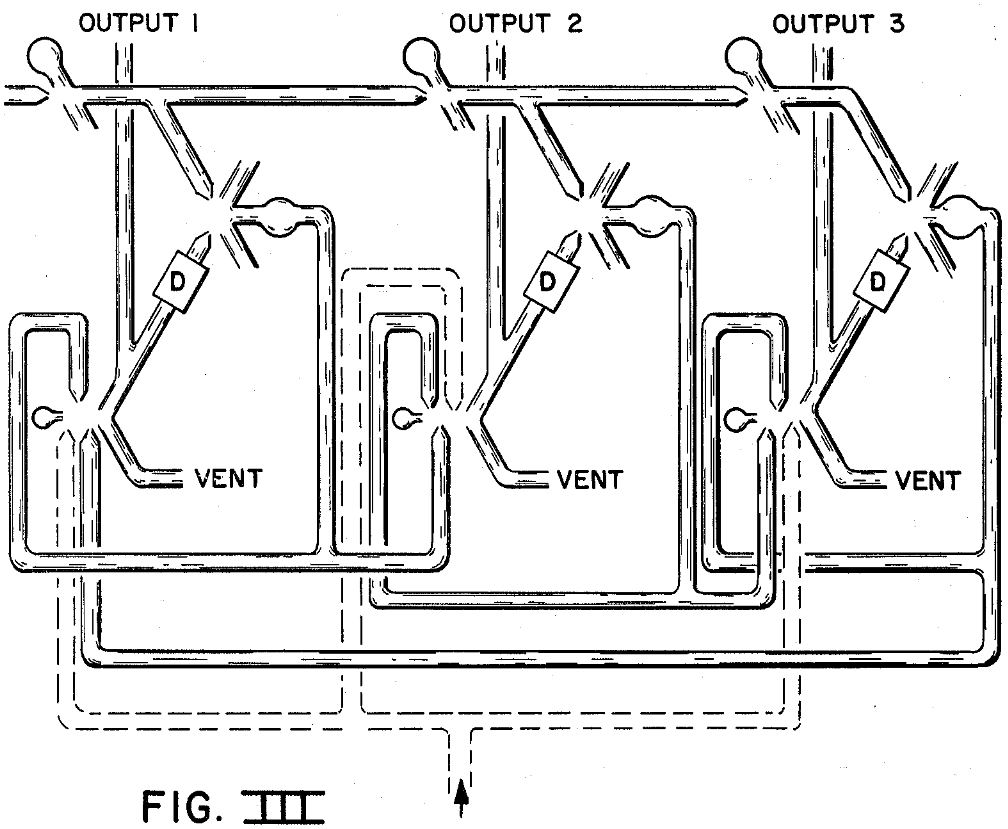
FIG. III
INVENTOR.
CAVAS M. GOBHAI
EDWARD SCHOPPE, JR.
BY Lawrence H. Patton
AGENT

United States Patent Office 3,250,471
Patented May 10, 1966

3,250,471
FLUID LOGIC RING COUNTER

Cavas M. Gobhai, Cambridge, and Edward Schoppe, Jr., Walpole, Mass., assignors to The Foxboro Company, Foxboro, Mass., a corporation of Massachusetts
Filed June 24, 1964, Ser. No. 377,752
2 Claims. (Cl. 235—201)

Figure 1:
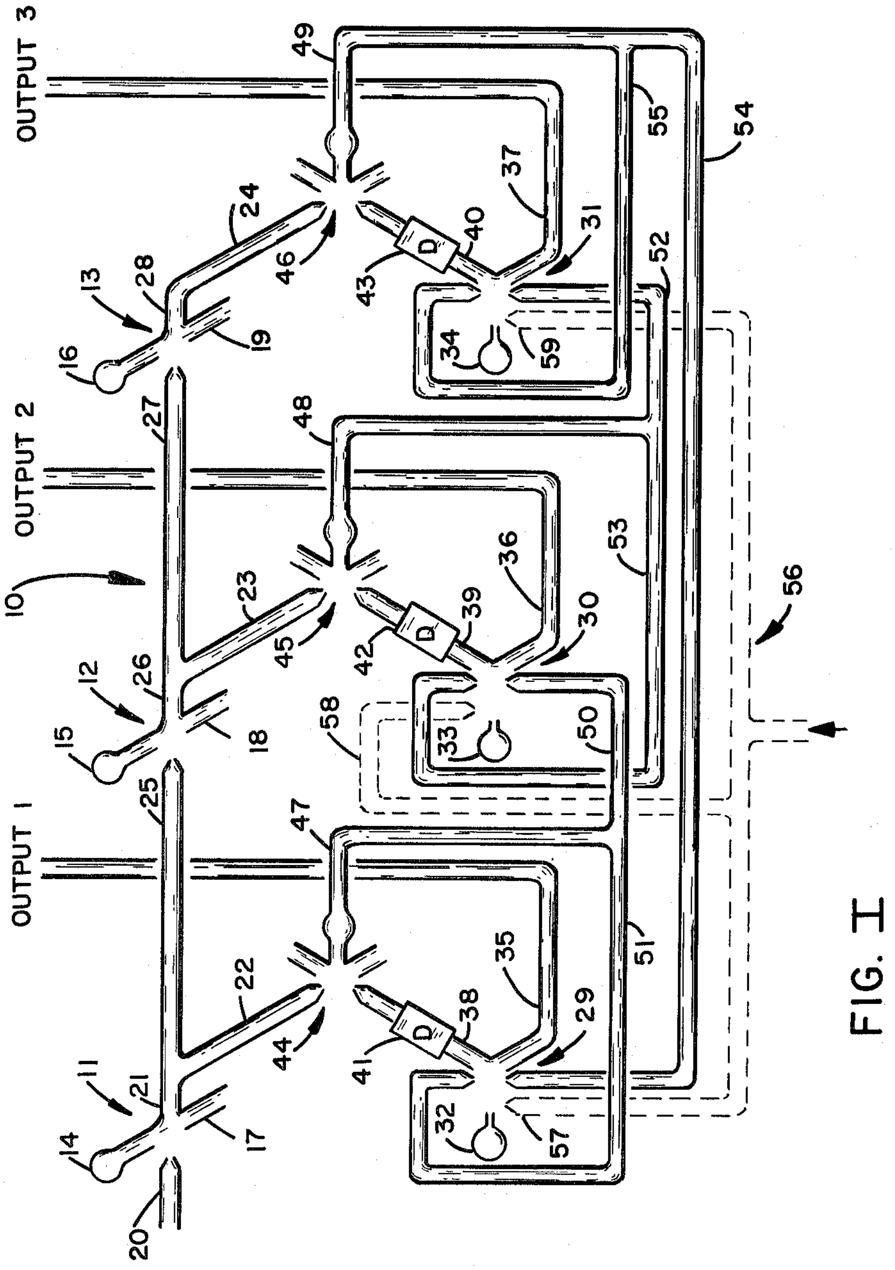

This invention relates to counter devices using fluid logic units on a dynamic continuous fluid flow basis. With such units and no moving parts, new and useful compact devices are provided.

In an application of this invention a series of fluid logic counter figures is provided in a binary coded basis.

The dynamic nature of this device provides for continuous flow of operating means so that, although there are changes in direction and allocation of such flows, there always exists a dynamic pattern of flow so that the full advantages of dynamic operation are provided.

It is therefore an object of this invention to provide a new and improved ring counter formed entirely of fluid logic devices and their connections and operated on a dynamic basis.

Other objects and advantages of this invention will be in part apparent and in part pointed out hereinafter and in the accompanying drawings, wherein:

FIGURE I is a schematic illustration of a particular application of this invention, providing a three stage fluid logic ring counter;

FIGURE II is a chart illustrating the operation of the device of FIGURE I; and

FIGURE III is a schematic illustration of another form of this invention.

In FIGURE I the operational dynamic flow is from left to right in the drawing. The device is provided with a main bus input fluid passage line indicated generally at 10, with a series of simple amplifiers 11, 12 and 13 spaced along the bus 10. Each of these amplifiers has a power source as at 14, 15 and 16 respectively, and each is provided with a vent 17, 18 and 19 respectively. Fluid from the power sources at 14, 15 and 16 are exhausted through vents 17, 18 and 19 when there is no signal in the bus. An input passage at the left hand end of the bus as the input for the device is indicated at 20 and a series of digital signals in the form of a pulse train is applied through the input passage 20 for the operation of this overall device.

When a pulse is applied to the input 20 the amplifier 11 is provided with an output in the bus 10 as at 21 with the fluid from the source 14 now being diverted from the vent 17 into the output 21.

The bus 10 is provided with branch outlets at 22 between amplifiers 11 and 12, at 23 between amplifiers 12 and 13, and a final outlet 24 beyond the amplifier 13.

Therefore a pulse applied to the bus input 20 results in a dynamic output from the first amplifier 11 in the passage 21, the branch 22 therefrom, and to a control input 25 to the amplifier 12.

The application of the signals in the input 25 results in an output from the second amplifier 12 in output passage 26, in branch passage 23 therefrom, and in a control input 27 to the amplifier 13.

In turn a signal applied in the control input 27 to the amplifier 13 results in an output from the power source 16 output passage 28 from the amplifier 13 and to the final outlet of the bus at 24.

In a parallel arrangement with respect to the fluid flow system of the bus 10 there is provided a series of three fluid logic flip-flop units 29, 30 and 31. Each of the flip-flop units is provided with a power source as at 32, 33 and 34. All of the power sources of the amplifiers for the bus 10 and in the fluid logic flip-flop units may be supplied from a common source if desired.

The flip-flop units 29, 30 and 31 are provided each with a single readout output passage as at 35, 36 and 37. These lead, as indicated, to outputs 1, 2 and 3 respectively and as referred to in the chart of FIGURE II.

The flip-flop units 29, 30 and 31 are provided with second output passages as at 38, 39 and 40 respectively, each of which includes a delay unit 41, 42 and 43 respectively.

Between the series arrangements of the amplifiers in the bus 10 and the series arrangement in the flip-flop units 29, 30 and 31 there is a parallel line of passive "and" gates established in series as at 44, 45 and 46.

These "and" gates receive as inputs, the branch passages from the bus 10, and the delay output lines from an input from the branch passage 22, and one from the delay flip-flop output 38.

In this "and" gate 44 there is provided a pair of vents in line respectively with the branch passage 22 from the bus 10, and with the delay passage 38 from the flip-flop 29. In the event of a signal in either one of these inputs to the "and" gate 44, but without a signal in the other, this signal would simply be vented from the "and" gate with no effect.

In the event of two signals arriving together, one in the branch 22 and one in the delay line 38, the "and" gate 44 will be provided with a common output signal through a common output passage as at 47. The common output passage from the "and" gate 44 is number 47, that from "and" gate 45 is 48, and that from "and" gate 46 is 49.

Referring back to the "and" gate 44 and its common output 47, when a signal appears in this output it accomplishes two purposes. It proceeds forward to the next stage, in passage 50, to prepare the next flip-flop unit 30, and the same signal feeds back through passage 51 to shut off the flip-flop unit 29 and terminate the "and" gate action in this manner.

Similarly, the passive "and" gate 45 in its common output 48 provides a signal to prepare the next stage, that is the flip-flop unit 31, for the next pulse, by way of passage 52, and at the same time feeds back by way of passage 53 to reset the flip-flop unit 30.

In like manner, in the final stage of this overall system, the common output 49 of the passive "and" gate 46 provides a signal in passage 54 to feed back to the first stage. This is flip-flop unit 29, and this action prepares it for the next step. At the same time through feed-back passage 55 it resets the flip-flop unit 31.

Considering FIGURE II and the chart therein, it will be seen that the action is continuous but it needs to start somewhere. For example, at the left-hand side of the chart the pulses are indicated as 1, 2, 3, 4. With outputs 1, 2, and 3 the continuing action is from pulse number 3 to pulse number 4 which in fact is pulse number 1 again. The change from pulse number 3 to pulse number 4 is the the flip-flop units. For example, the "and" gate 44 has same as changing from pulse number 3 to pulse number 1. In order to accomplish a suitable start-up situation on a positive basis, means is provided whereby these start-up situations are considered as the situation of pulse number 3, that is, output 1 is "0," output 2 is "1," and output 3 is "0," wherein "1" indicates an "on" situation with a fluid flow from the output, and "0" is an "off" situation with no fluid flow from the output.

Therefore, if this system is established according to pulse number 3, output 1 is "0," output 2 is "1," output 3 is "0." Then the first pulse entering the device will make the next change to that indicated in the FIGURE II chart as pulse number 1, that is "0" remains "0" in output 1, "1" becomes "0" in output 2, and "0" becomes "1" in output 3.

In order to establish the pulse number 3 situation in the starting point a starting set signal system is provided as indicated generally at 56. This includes a control input 57 to the flip-flop unit 29, a control input 58 to the flip-flop 30, and a control input 59 to the flip-flop 31.

Note that the controls 57 and 59 in flip-flop units 29 and 31 are arranged to put the flip-flop upward into the respective delay output therefor and that the control 58 to the flip-flop unit 30 is arranged to put the output of that flip-flop into the output passage 36 therefrom.

Accordingly there is a preparatory pulse in the system 56 which has positively established the output 1 as "0," output 2 as "1" and output 3 as "0." That is, the FIGURE II pulse three situation is now ready for a new pulse to change it to pulse "one" situation.

Other similar suitable start-up situations may be established as desired in like manner.

Considering the start-up situation of pulse number 3 and the following input of pulse number 1 to the bus system 10, both control signals are thus applied to the "and" gate 44 and a common output 47 is provided therefrom which tends to reset the flip-flop unit 29, but this does not happen because in the third stage the output is "0." There is, therefore, a meeting of signals in the "and" gate 46 with a common output therefrom which feeds back to the flip-flop unit 29 opposing the reset signal from the "and" gate 44 so that in the flip-flop 29 the output remains in the delay passage 38 and the output 1 remains "0" as indicated in the chart in FIGURE II from pulse 3 to pulse 1 "0" remains "0."

In the second stage, which was 1, the new entering signal from the "and" gate 44 operates the flip-flop to put an output in the passage 39, but through delay 42 so it has no action with respect to this pulse, except to take the signal from the output passage 36 and therefore change the pulse 3 output "1" to the pulse 1 output "0." Thus the input signal through the bus branch 23 does not provide a common output from the "and" gate 45 because of the delay of 42.

The third stage in the flip-flop 31 was "0" and becomes "1." Since it was "0," there is now a meeting of signals in the "and" gate 46 to provide an output in passage 49 as previously mentioned. This output is applied to the flip-flop unit 31 and changes the flow from the delay output 40 to the operating output 37 to give a "1" signal in the output 3.

Accordingly, it will be seen that the changes have been made from the FIGURE II chart pulse 3 situation to the pulse 4 situation which is the same as the pulse 1 situation. The ring counter thus continues indefinitely as long as pulses are applied to the input of the bus system 10.

The FIGURE III device is similar in structure and function to that of FIGURE I, and the FIGURE II chart applies. In FIGURE III, the readouts are from the delay line side of the flip-flop outputs. In the FIGURE II device simultaneous opposing controls to a flip-flop is used.

In another form, the FIGURE I showing is a complementary ring counter that may be set up with a travelling zero instead of a travelling "one." Pulse number 1 would be "one," "one," zero; pulse number 2 would be zero, "one," "one"; and so on. This is useful when the outputs are to "not" elements or like functions.

This invention therefore provides a new and useful ring counter particularly in the form of a dynamic fluid flow system with compact fluid logic units.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

1. A fluid logic ring counter comprising an input fluid passage bus for receiving a signal pulse train, said passage including a series of simple fluid amplifiers, the first being operated by the input pulses directly and the others being operated by the output of the previous amplifier, with branch outlets from said bus between each of the adjacent amplifiers and with a final outlet beyond the final amplifier, a series of fluid logic flip-flop units one related respectively to each of said bus outlets, each having one outlet to a readout passage and another outlet with a delay therein, and an intermediate series of fluid logic passive "and" gates, one respectively related to each of the combinations of one of said bus outlets and one of said flip-flop units, each of said "and" gates having as its inputs one of said bus outlets and the respective delay passage outlet from the respective flip-flop unit, the common output from each of said "and" gates comprising a preparatory control input to the following of said flip-flop units and a reset control input to its own flip-flop unit, such preparatory action for the following flip-flop unit in the case of the final stage of said series being from the final stage passive "and" gate common output through a control input to the fluid logic flip-flop unit of the first stage of the counter.

2. A fluid logic ring counter comprising an input fluid passage bus for receiving a signal pulse train, said passage including a series of simple fluid amplifiers, the first being operated by the input pulses directly and the others being operated by the output of the previous amplifier, with branch outlets from said bus between each of the adjacent amplifiers and with a final outlet beyond the final amplifier, a series of fluid logic flip-flop units one related respectively to each of said bus outlets, each having one outlet to a vent and another outlet with a delay therein, and with a readout passage branch prior to said delay, and an intermediate series of fluid logic passive "and" gates, one respectively related to each of the combinations of one of said bus outlets and one of said flip-flop units, each of said "and" gates having as its inputs one of said bus outlets and the respective delay passage outlet from the respective flip-flop unit, the common output from each of said "and" gates comprising a preparatory control input to the following of said flip-flop units and a reset control input to its own flip-flop unit, such preparatory action for the following flip-flop unit in the case of the final stage of said series being from the final stage passive "and" gate common output through a control input to the fluid logic flip-flop unit of the first stage of the counter.

References Cited by the Examiner

UNITED STATES PATENTS

| | | | |
|---|---|---|---|
| 3,190,554 | 6/1965 | Gehring et al. | 235—201 |
| 3,193,197 | 7/1965 | Bauer | 235—201 |

OTHER REFERENCES

Norwood: "Generating Timed Pneumatic Pulses," IBM Technical Disclosure Bulletin, vol. 5, No. 9, February 1963, pages 13–14.

Mitchell: "Fluid Binary Counter," IBM Technical Disclosure Bulletin, vol. 6, No. 2, July 1963, page 30.

Grubb: "Fluid Logic Shift Register With Intermediate Stages," IBM Technical Disclosure Bulletin, vol. 6, No. 1, June 1963, pages 24–25.

LOUIS J. CAPOZI, *Primary Examiner.*

LEO SMILOW, *Examiner.*

W. F. BAUER, *Assistant Examiner.*